(12) United States Patent
Hagen et al.

(10) Patent No.: US 12,429,261 B2
(45) Date of Patent: Sep. 30, 2025

(54) FLUID CONNECTION ASSEMBLY

(71) Applicant: Oetiker NY, Inc., Lancaster, NY (US)

(72) Inventors: Kristian James Hagen, Gasport, NY (US); Kari Ann Sausen, Clarence, NY (US); Ryan Zillig, Williamsville, NY (US)

(73) Assignee: Oetiker NY, Inc., Lancaster, NY (US)

( * ) Notice: Subject to any disclaimer, the term of this patent is extended or adjusted under 35 U.S.C. 154(b) by 0 days.

(21) Appl. No.: 18/836,593

(22) PCT Filed: Apr. 5, 2022

(86) PCT No.: PCT/US2022/071547
§ 371 (c)(1),
(2) Date: Aug. 7, 2024

(87) PCT Pub. No.: WO2023/196021
PCT Pub. Date: Oct. 12, 2023

(65) Prior Publication Data
US 2025/0146722 A1    May 8, 2025

(51) Int. Cl.
*F25B 41/40* (2021.01)
*F16L 37/12* (2006.01)

(52) U.S. Cl.
CPC ........... *F25B 41/40* (2021.01); *F16L 37/12* (2013.01)

(58) Field of Classification Search
CPC ......... F16L 41/021; F16L 23/04; F16L 23/06; F16L 33/035; F16L 37/008; F16L 21/06
See application file for complete search history.

(56) References Cited

U.S. PATENT DOCUMENTS

| | | | |
|---|---|---|---|
| 4,039,212 A * | 8/1977 | Skarud | F16L 41/021 |
| 4,640,534 A | 2/1987 | Hoskins et al. | |
| 4,753,458 A | 6/1988 | Case et al. | |
| 5,297,818 A | 3/1994 | Klinger | |
| 5,459,500 A | 10/1995 | Klinger et al. | |
| 5,468,028 A | 11/1995 | Olson | |
| 5,472,242 A | 12/1995 | Petersen | |

(Continued)

FOREIGN PATENT DOCUMENTS

| | | |
|---|---|---|
| CA | 2541226 A1 | 11/2006 |
| CN | 104884853 | 9/2015 |

(Continued)

OTHER PUBLICATIONS

Ferrobend "Advantaged of Threaded Pipe Fittings | Disadvantages of Threaded Pipe Fittings," retrieved from <https://www.forgedpipefittings.com/blog/advantages-and-disadvantages-of-threaded-pipe-fittings.php> 2 pages.

(Continued)

*Primary Examiner* — Zachary T Dragicevich
(74) *Attorney, Agent, or Firm* — Harter Secrest & Emery LLP; Michael Nicholas Vranjes

(57) ABSTRACT

A fluid connection assembly, including a service valve body, including a first section forming a first port and a second port, a second section connected to the first section and forming a third port, a connector body forming a fourth port and including a first end connected to the first section, a second end, a first radially outward facing surface including an annular groove, and a first radially inward facing surface.

14 Claims, 3 Drawing Sheets

(56) References Cited

U.S. PATENT DOCUMENTS

| | | | |
|---|---|---|---|
| 5,584,411 A | 12/1996 | Channell et al. | |
| 5,647,612 A | 7/1997 | Yoshida et al. | |
| 5,681,061 A | 10/1997 | Olson | |
| 5,694,971 A * | 12/1997 | Wilcock | F16L 41/06 |
| 5,842,450 A | 12/1998 | Fort et al. | |
| 5,909,901 A | 6/1999 | Zillig et al. | |
| 5,979,946 A | 11/1999 | Petersen et al. | |
| 6,481,086 B1 | 11/2002 | Davidson | |
| 6,880,859 B2 | 4/2005 | Breay et al. | |
| 6,913,294 B2 | 7/2005 | Treverton et al. | |
| 7,128,347 B2 | 10/2006 | Kerin | |
| 7,240,930 B2 | 7/2007 | Stravitz | |
| 7,300,078 B2 | 11/2007 | Yamamoto et al. | |
| 7,364,207 B2 | 4/2008 | McGee et al. | |
| 7,497,477 B2 | 3/2009 | Pepe | |
| 7,631,905 B2 | 12/2009 | McGee et al. | |
| 7,802,822 B2 | 9/2010 | Poder et al. | |
| 7,828,338 B2 | 11/2010 | Kertesz et al. | |
| 7,963,570 B2 | 6/2011 | Swift et al. | |
| 8,375,550 B2 | 2/2013 | Swift et al. | |
| 9,791,079 B2 | 10/2017 | Considine et al. | |
| 10,221,976 B2 | 3/2019 | Kujawski et al. | |
| 10,273,996 B2 | 4/2019 | Whitaker et al. | |
| 10,281,075 B2 | 5/2019 | Hontz et al. | |
| 10,738,922 B2 | 8/2020 | Rempert et al. | |
| 10,738,926 B2 | 8/2020 | Stieler | |
| 10,781,958 B2 | 9/2020 | Fremont | |
| 10,808,872 B2 | 10/2020 | Chaupin et al. | |
| 11,092,269 B2 | 8/2021 | Kujawski, Jr. et al. | |
| 11,781,690 B2 | 10/2023 | Barthel et al. | |
| 2006/0289066 A1 | 12/2006 | Lesage | |
| 2007/0132235 A1 | 6/2007 | Catlow | |
| 2008/0111376 A1 | 5/2008 | Ferrero | |
| 2009/0091125 A1 | 4/2009 | Takeda et al. | |
| 2009/0119886 A1 | 5/2009 | Werth | |
| 2010/0032937 A1 | 2/2010 | Kerin et al. | |
| 2011/0006517 A1 | 1/2011 | Nakata | |
| 2011/0101674 A1 | 5/2011 | Benvenuto et al. | |
| 2012/0104746 A1 | 5/2012 | Fansler et al. | |
| 2012/0312404 A1 * | 12/2012 | Choi | F16L 37/0927 |
| 2014/0210202 A1 | 7/2014 | Hess et al. | |
| 2016/0363247 A1 | 12/2016 | McCure | |
| 2017/0114935 A1 | 4/2017 | Kujawski, Jr. et al. | |
| 2017/0254453 A1 | 9/2017 | Fremont et al. | |
| 2018/0328525 A1 | 11/2018 | Kerin, Jr. | |
| 2019/0063656 A1 | 2/2019 | Kujawski, Jr. | |
| 2019/0331275 A1 | 10/2019 | Kujawski, Jr. | |
| 2020/0166167 A1 | 5/2020 | Hagen et al. | |
| 2020/0191310 A1 | 6/2020 | Kim et al. | |
| 2022/0049731 A1 | 2/2022 | You | |

FOREIGN PATENT DOCUMENTS

| | | |
|---|---|---|
| CN | 111306388 A | 6/2020 |
| CN | 111594624 | 8/2020 |
| CN | 212251624 | 12/2020 |
| CN | 112648460 A | 4/2021 |
| CN | 113738983 | 12/2021 |
| DE | 102011121828 | 6/2013 |
| EP | 1939514 | 7/2008 |
| EP | 3361134 | 8/2018 |
| EP | 3430302 | 4/2020 |
| JP | H10306889 A | 11/1998 |
| JP | 2007-182993 A | 7/2007 |
| JP | 2008-082463 A | 4/2008 |
| JP | 2008-281190 A | 11/2008 |
| JP | 2010-038365 A | 2/2010 |
| JP | 4703885 | 6/2011 |
| JP | 2013-534992 A | 9/2013 |
| JP | 2013242038 A | 12/2013 |
| JP | 5743765 | 7/2015 |
| JP | 2017-096494 A | 6/2017 |
| JP | 2019-011862 A | 1/2019 |
| JP | 2019152324 A | 9/2019 |
| JP | 2020-514635 A | 5/2020 |
| JP | 2020-530891 A | 10/2020 |
| JP | 2021001626 | 1/2021 |
| JP | 2021-191972 A | 12/2021 |
| KR | 20190105345 A | 9/2019 |
| KR | 10-2022-0025147 A | 3/2022 |
| WO | 2021126215 | 6/2021 |

OTHER PUBLICATIONS

Emmanuel (Mar. 2024) "Threaded vs. Socket Weld Fittings: Which is the Best Option?" Trupply, retrieved from <https://www.trupply.com/blogs/news/threaded-vs-socket-weld-fittings-which-is-the-best-option?srsltid=AfmBOooOIQ--wv2HtcsMKOnukhxQjHZxk6hr6tlBH8jQnCetnPUJUx59> 3 pages.

* cited by examiner

FLUID CONNECTION ASSEMBLY

CROSS-REFERENCE TO RELATED APPLICATIONS

The present application is the U.S. National Stage Application pursuant to 35 U.S.C. § 371 of International Patent Application No. PCT/US2022/71547, filed on Apr. 5, 2022, which application is hereby incorporated by reference herein in its entirety.

FIELD

The present disclosure relates to fluid connectors, and more particularly, to a fluid connection assembly for a refrigeration system including a retainer that decreases the insertion force required for assembly and allows for quick assembly without the need for tools.

BACKGROUND

Fluid connectors, fluid connections, and fluid connection assemblies are integral components for many applications, and especially for automotive and industrial applications. Since refrigeration systems are made up of various components such as a compressor, air cooler, condenser, receiver, evaporator or chiller, and/or suction drum, fluid must be able to travel not only within each component but also between components. Fluid predominantly moves between components via flexible or rigid hoses which connect to each component by fluid connectors. Such fluid connectors typically include a retaining clip, retaining ring clip, or snap ring carried on the connector body which is adapted to snap behind a raised shoulder of a tube when the tube is fully inserted into the connector body. However, in order for the fluid connector to properly function, slots or apertures must be machined in the connector body such that the retaining clip can protrude therethrough and engage the tube, which requires extra post-process manufacturing. During the assembly process, installation of the retaining clip onto the connector body is difficult and failure to install the retaining clip properly can jeopardize the structural integrity of the retaining clip. Additionally, the force required to engage the tube into the connector body, and overcome the radial force of the retaining clip, is very large with current designs. Also, since the retaining clips are very thin and small, it is easy to lose them if dropped or misplaced. Furthermore, some connection assembly solutions take a long time to secure and require tools for the assembly process. Moreover, current connection assembly solutions do not indicate the connection state of the assembly.

Thus, there has been a long-felt need for a fluid connection assembly for a refrigeration system including a retainer that allows for disassembly, eliminates the need for post-process machining, and reduces the insertion force required to assemble the fluid connector.

SUMMARY

According to aspects illustrated herein, there is provided a fluid connection assembly, comprising a service valve body, including a first section forming a first port and a second port, a second section connected to the first section and forming a third port, a connector body forming a fourth port and comprising a first end connected to the first section, a second end, a first radially outward facing surface comprising an annular groove, and a first radially inward facing surface.

In some embodiments, the first port and the second port are concentrically aligned. In some embodiments, the third port and the fourth port are concentrically aligned. In some embodiments, at least one of the second section and the connector body are arranged perpendicular to the first section. In some embodiments, the first radially inward facing surface comprises at least one annual groove. In some embodiments, the at least one annular groove comprises a first annular groove, and a second annular groove spaced apart in an axial direction from the first annular groove. In some embodiments, a seal is arranged in the at least one annular groove. In some embodiments, the fluid connection assembly further comprises a flange fixedly secured to the first section proximate the second port. In some embodiments, at least one of the first section and the second section comprises radially outward facing threading.

In some embodiments, the fluid connection assembly further comprises a retainer, the retainer including a third end operatively arranged to be removably connectable to the connector body, a fourth end, a first section, a second section displaceable with respect to the first section, a second radially inward facing surface, and a second radially outward facing surface. In some embodiments, the second radially inward facing surface comprises a first flange extending radially inward proximate the third end, and a second flange extending radially inward proximate the fourth end. In some embodiments, the first flange comprises a first diameter the second flange comprises a second diameter, and the first diameter is greater than the second diameter.

According to aspects illustrated herein, there is provided a fluid connection assembly, comprising a service valve body, including a first section forming a first port and a second port, a second section connected to the first section and forming a third port, a connector body forming a fourth port and comprising a first end connected to the first section, a second end, a first radially outward facing surface comprising an annular groove, and a first radially inward facing surface, and a retainer, including a third end operatively arranged to be removably connectable to the connector body, a fourth end, a first section, a second section displaceable with respect to the first section, a second radially inward facing surface, and a second radially outward facing surface.

In some embodiments, the first radially inward facing surface comprises at least one annual groove. In some embodiments, the at least one annular groove comprises a first annular groove, and a second annular groove spaced apart in an axial direction from the first annular groove. In some embodiments, a seal is arranged in the at least one annular groove. In some embodiments, the fluid connection assembly further comprises a flange fixedly secured to the first section proximate the second port. In some embodiments, the second radially inward facing surface comprises a first flange extending radially inward proximate the third end and operatively arranged to engage the annular groove, and a second flange extending radially inward proximate the fourth end. In some embodiments, the first flange comprises a first diameter, the second flange comprises a second diameter, and the first diameter is greater than the second diameter. In some embodiments, the fluid connection assembly further comprises a tube including a shoulder, wherein the second flange is operatively arranged to engage the shoulder to secure the tube in the connector body.

According to aspects illustrated herein, there is provided an integrated service port quick connect that improves the ease of connection for industrial refrigerant applications, as well as eliminates the need for braze or solder joints. The present disclosure reduces the potential for operator induced quality failures and/or leaks, and the amount of time to connect a system.

The service port of the present disclosure comprises a quick connect integrated therein. The quick connect comprises one or more O-rings and a flange to receive a plastic retainer. The tube bead abuts to the quick connect flange and the retainer closes in on the bead and the quick connect flange to retain the tube and prevent it from being removed. To service the system in the field, the retainer can be a replacement part provided by a service technician. Using a small pick/tool, the latch on the retainer is pried open.

These and other objects, features, and advantages of the present disclosure will become readily apparent upon a review of the following detailed description of the disclosure, in view of the drawings and appended claims.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

Figure 1A:
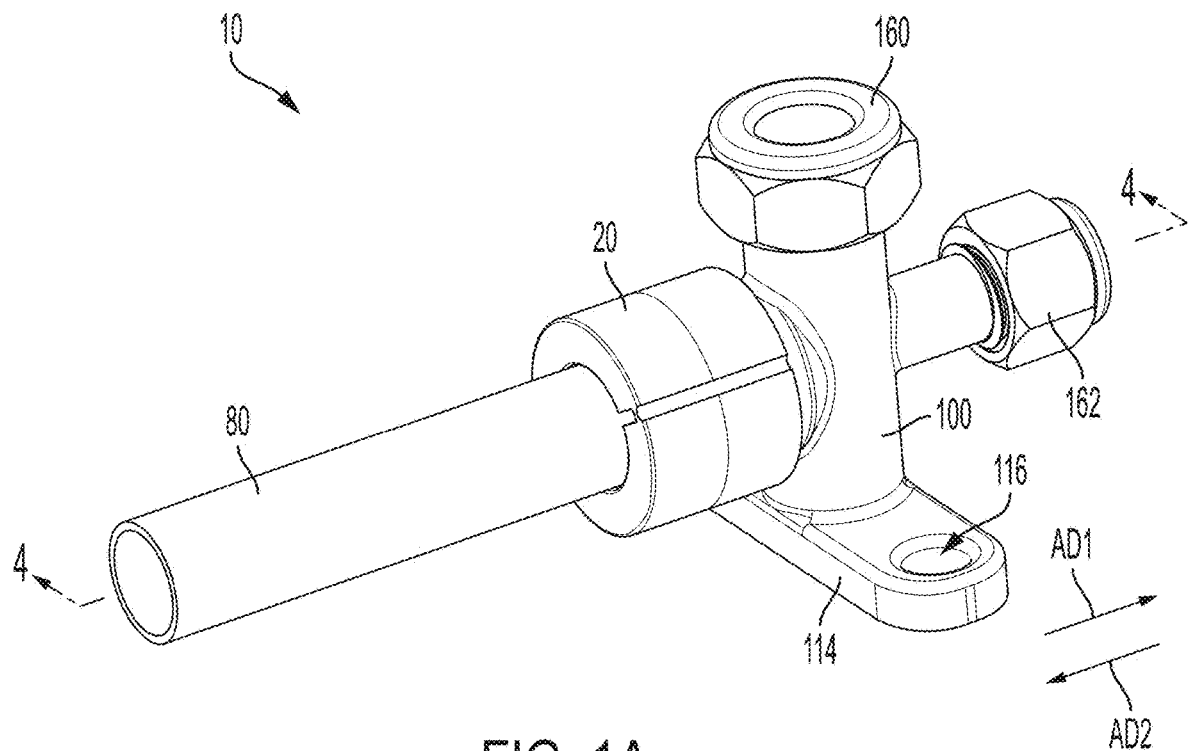
FIG. 1A is a front perspective view of a fluid connection assembly.

At the outset, it should be appreciated that like drawing numbers on different drawing views identify identical, or functionally similar, structural elements. It is to be understood that the claims are not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the claims.

Unless defined otherwise, all technical and scientific terms used herein have the same meaning as commonly understood to one of ordinary skill in the art to which this disclosure pertains. It should be understood that any methods, devices or materials similar or equivalent to those described herein can be used in the practice or testing of the example embodiments. The assembly of the present disclosure could be driven by hydraulics, electronics, pneumatics, and/or springs.

It should be appreciated that the term "substantially" is synonymous with terms such as "nearly," "very nearly," "about," "approximately," "around," "bordering on," "close to," "essentially," "in the neighborhood of," "in the vicinity of," etc., and such terms may be used interchangeably as appearing in the specification and claims. It should be appreciated that the term "proximate" is synonymous with terms such as "nearby," "close," "adjacent," "neighboring," "immediate," "adjoining," etc., and such terms may be used interchangeably as appearing in the specification and claims. The term "approximately" is intended to mean values within ten percent of the specified value.

It should be understood that use of "or" in the present application is with respect to a "non-exclusive" arrangement, unless stated otherwise. For example, when saying that "item x is A or B," it is understood that this can mean one of the following: (1) item x is only one or the other of A and B; (2) item x is both A and B. Alternately stated, the word "or" is not used to define an "exclusive or" arrangement. For example, an "exclusive or" arrangement for the statement "item x is A or B" would require that x can be only one of A and B. Furthermore, as used herein, "and/or" is intended to mean a grammatical conjunction used to indicate that one or more of the elements or conditions recited may be included or occur. For example, a device comprising a first element, a second element and/or a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element.

Moreover, as used herein, the phrases "comprises at least one of" and "comprising at least one of" in combination with a system or element is intended to mean that the system or element includes one or more of the elements listed after the phrase. For example, a device comprising at least one of: a first element; a second element; and, a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element. A similar interpretation is intended when the phrase "used in at least one of:" is used herein. Furthermore, as used herein, "and/or" is intended to mean a grammatical conjunction used to indicate that one or more of the elements or conditions recited may be included or occur.

It should be appreciated that the term "tube" as used herein is synonymous with hose, pipe, channel, conduit, tube end form, or any other suitable pipe flow used in hydraulics and fluid mechanics. It should further be appreciated that the term "tube" can mean a rigid or flexible conduit of any material suitable for containing and allowing the flow of a gas or a liquid.

"Fully assembled locked state" as used herein refers to the fluid connection assembly and indicates that the tube is fully connected to the service valve body and the retainer is fully connected to the service valve body to retain the tube therein. "Partially assembled locked state" as used herein refers to the fluid connection assembly and indicates that the retainer is fully connected to the service valve body but the tube is not arranged in the service valve body or the retainer. The retainer may also be described as having a "locked state" or an "unlocked state," which indicates the state of the retainer independent of the service valve body and the tube.

Figure 1B:
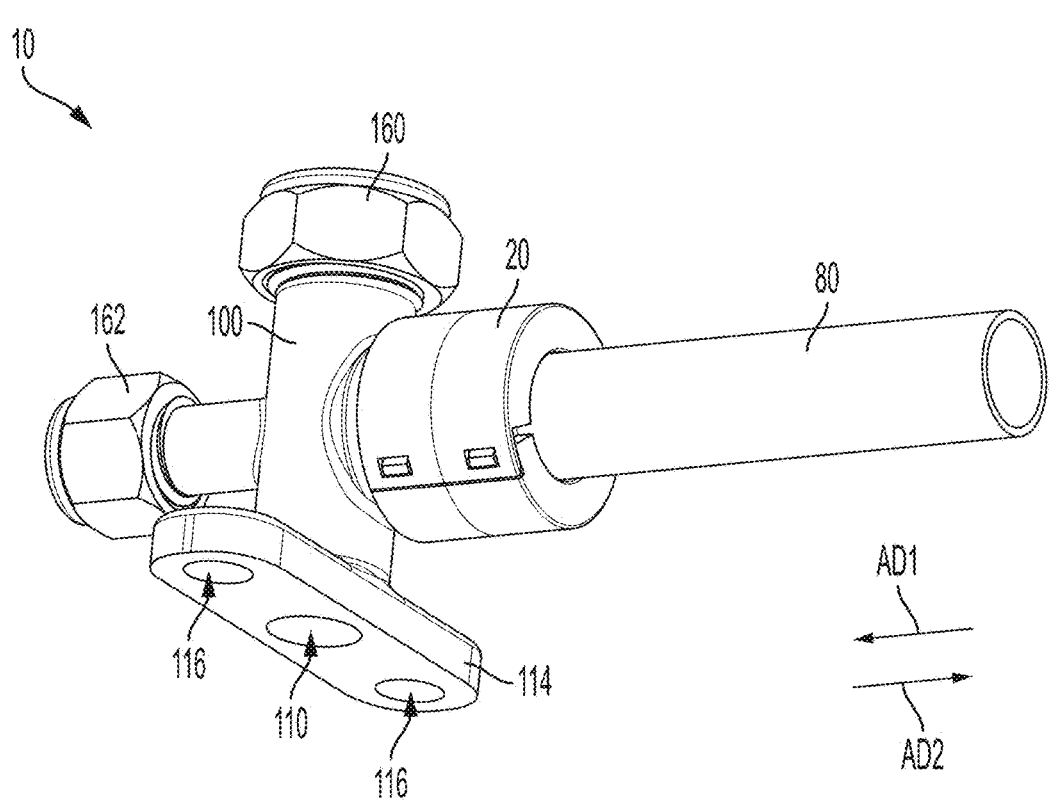
FIG. 1B is a rear perspective view of the fluid connection assembly shown in FIG. 1A.
Figure 2:
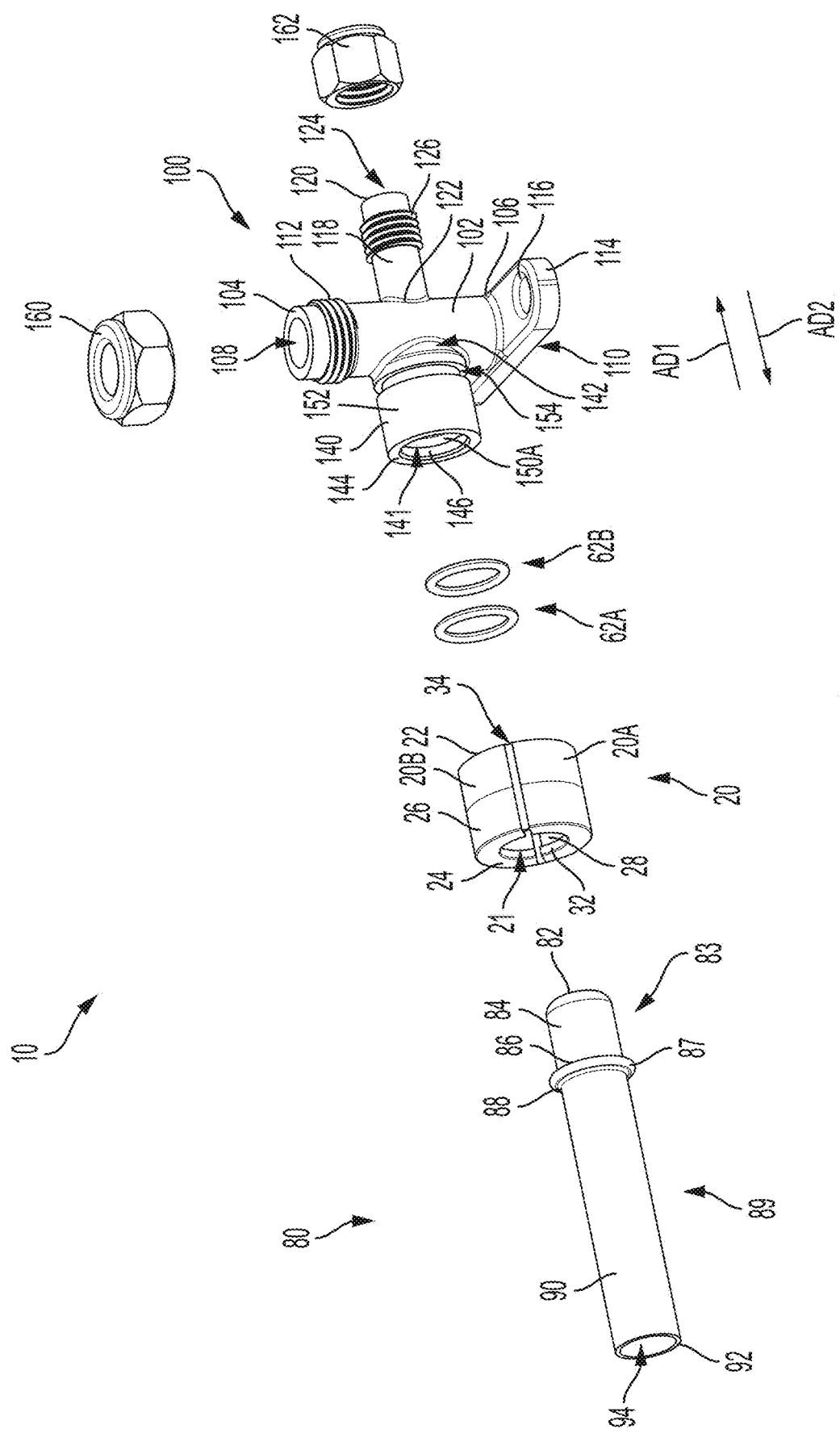
FIG. 2 is an exploded perspective view of the fluid connection assembly shown in FIG. 1A.

Adverting now to the figures, FIG. 1A is a front perspective view of fluid connection assembly 10. FIG. 1B is a rear perspective view of fluid connection assembly 10. FIG. 2 is an exploded perspective view of fluid connection assembly 10. Fluid connection assembly 10 generally comprises retainer 20, tube 80, and service valve body 100. The following description should be read in view of FIGS. 1A-2.

Tube 80 comprises end 82, section 83, bead or shoulder 87, section 89, end 82, and through-bore 94. Through-bore 94 extends through tube 80 from end 82 to end 92. Section 83 is arranged between end 82 and shoulder 87 and comprises radially outward facing surface 84. Radially outward facing surface 84 includes a substantially constant diameter. In some embodiments, radially outward facing surface 84 comprises a frusto-conical taper or curvilinear surface proximate end 82 (see FIG. 4). Shoulder 87 is arranged between section 83 and section 89 and comprises surface 86 and surface 88. In some embodiments, surface 86 is an axial surface facing at least partially in axial direction AD1 and surface 88 is an axial surface facing at least partially in axial direction AD2. In some embodiments, surface 86 is a frusto-conical surface extending from the radially outward facing surface of shoulder 87 radially inward in axial direction AD1. For example, surface 86 may be a linear conical shape and increase in diameter in axial direction AD2. In some embodiments, surface 86 may comprise a linear portion and a conical or frusto-conical portion. Section 89 is arranged between shoulder 87 and end 92 and comprises radially outward facing surface 90. Radially outward facing surface 90 includes a substantially constant diameter. Tube 80 is arranged to be inserted, specifically with end 82 first, into connector body 140. Tube 80 is inserted into connector body 140 until section 83, or radially outward facing surface 84, engages seals 62A-B (see FIG. 4). Shoulder 87 engages end 144, more specifically, surface 86 abuts against and/or engages end 144, at which point retainer 20 is assembled to secure tube 80 to service valve body 100, as will be described in greater detail below. It should be appreciated that tube 80 may be any traditional tube or tube end form comprising a bead, radially outward extending protrusion or flange, or ramp profile, which extends radially outward and axially on the outer surface of the tube, to secure the tube within the connector body. In some embodiments, tube 80 comprises a metal, a polymer, and/or a ceramic.

Figure 3:
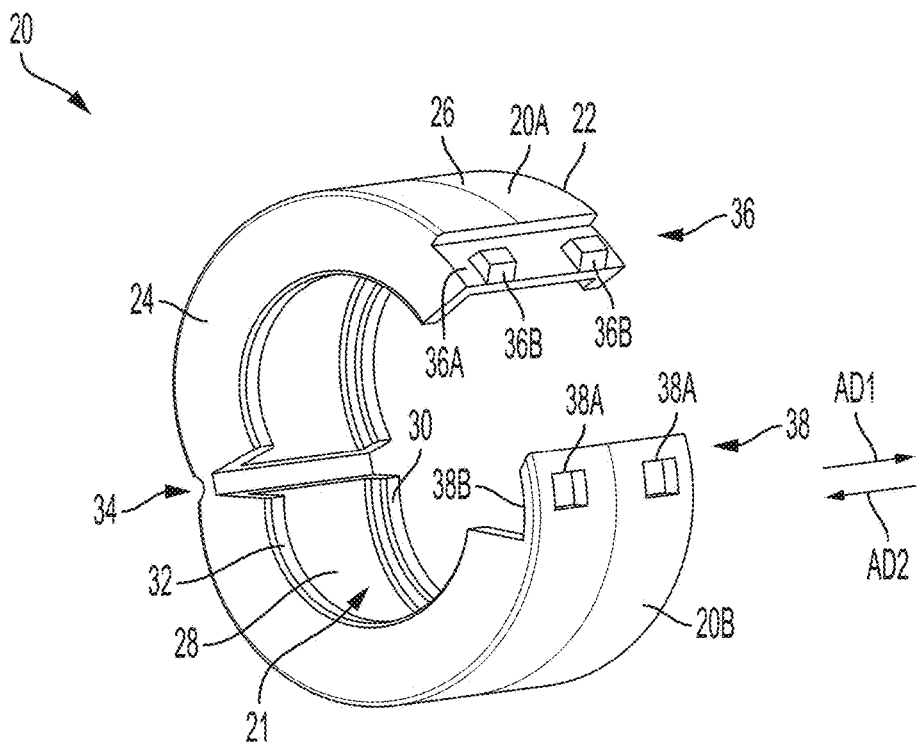
FIG. 3 is a perspective view of the retainer shown in FIG. 1A, in an unlocked state; and, FIG. 4 is a cross-sectional view of the fluid connection assembly taken generally along line 4-4 in FIG. 1A.
Figure 4:
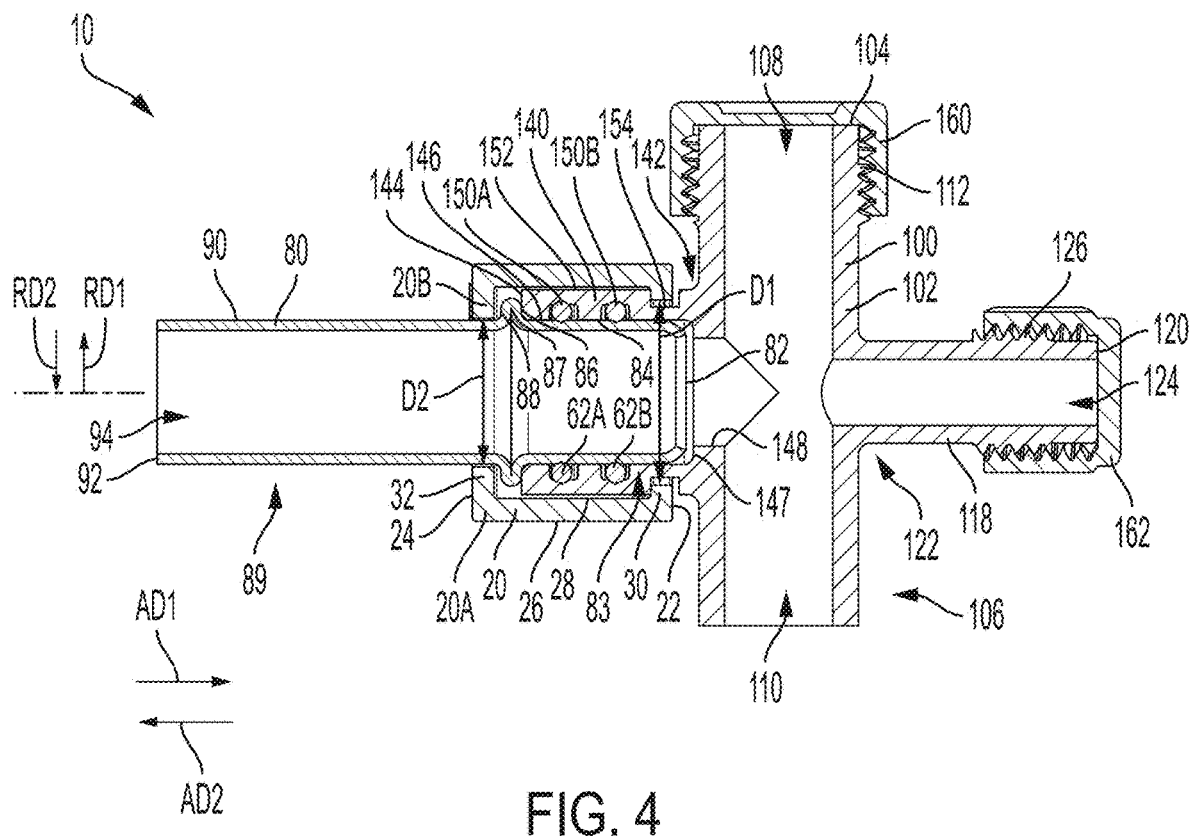

FIG. 3 is a perspective view of retainer 20, in an unlocked state. Retainer 20 is shown in FIGS. 1A-2 in a locked state. FIG. 4 is a cross-sectional view of fluid connection assembly 10 taken generally along line 4-4 in FIG. 1A. The following description should be read in view of FIGS. 1A-4.

Retainer 20 generally comprises section 20A, section 20B, end 22, end 24, hole 21 extending from end 22 to end 24, radially outward facing surface 26, and radially inward facing surface 28. In some embodiments, section 20A is hingedly connected to section 20B, via, for example, hinge 34. In some embodiments, hinge 34 is a living hinge. In some embodiments, section 20A is removably connected to section 20B. When sections 20A and 20B are connected or retainer 20 is in the locked state (FIGS. 1A-2), hole 21 is formed therebetween; however, it should be appreciated that even in the unlocked state (FIG. 3), it could be said that each of sections 20A and 20B include a respective hole 21.

Radially inward facing surface 28 extends from end 22 to end 24 and is operatively arranged to engage radially outward facing surface 152. Radially inward facing surface 28 comprises flange 30 extending radially inward therefrom. In some embodiments, flange 30 is arranged immediately adjacent end 22. Flange 30 is operatively arranged to engage groove 154 and radially inward facing surface 28 is operatively arranged to engage radially outward facing surface 152 to connect retainer 20 to connector body 140. Flange 30 comprises diameter D1. Radially inward facing surface 28 further comprises flange 32 extending radially inward therefrom. In some embodiments, flange 32 is arranged immediately adjacent end 24. Flange 32 is operatively arranged to engage shoulder 87 to connect tube 80 to connector body 140. Flange 32 comprises diameter D2. In some embodiments, diameter D1 is greater than diameter D2.

As best seen in FIG. 4, flange 32 is spaced apart from flange 30 by a first distance. Groove 154 is spaced apart from end 144 by a second distance. Shoulder 87 comprises a width equal to a third distance. The first distance is substantially equal to the sum of the second distance and the third distance. This design results in, when retainer 20 is connected to connector body 140 and tube 80, flange 32 abutting against surface 88, as well as surface 86 abutting against end 144 (i.e., retainer 20 clamps shoulder 87 to end 144). In some embodiments, the first distance is less than the sum of the second distance and the third distance. This results in shoulder 87 and connector body 140 being squeezed or clamped together. In some embodiments, the first distance is greater than the sum of the second distance and the third distance such that shoulder 87 is engaged or in close proximity with connector body 140. Additionally, flange 30 comprises a first width and groove 154 comprises a second width, the second width being greater than the first width. As such, when retainer 20 is connected to connector body 140 without tube 80 arranged therein, retainer 20 is capable of sliding or displacing in axial direction AD1 and axial direction AD2 with respect to connector body 140. When tube 80 is properly secured to connector body 140 by retainer 20, retainer 20 is not capable of displacing in axial direction AD1 and axial direction AD2 with respect to connector body 140. This feature provides an indicator as to the connection status of fluid connection assembly 10 and will be described in greater detail below. In some embodiments, the first width is substantially equal to the second width.

As previously described, flange 32 comprises diameter D2, which is less than the diameter of shoulder 87. This design prevents shoulder 87 from being removed from connector body 140, or tube 80 from displacing in axial direction AD2 or rotating (i.e., bending moment) relative to connector body 140. Tube 80 may still rotate in a circumferential direction with respect to connector body 140 and retainer 20.

Section 20A comprises male connector 36 and section 20B comprises female connector 38. As shown, male connector 36 on section 20A is arranged to engage female connector 38 on section 20B such that sections 20A and 20B are fixedly secured. In some embodiments, male connector 36 is hook-shaped (in a radially outward direction) and includes groove 36A and one or more radially outward extending projections 36B. Groove 36A is arranged in radially outward facing surface 26. Projections 36B extend generally radially outward in radial direction RD1 from groove 36A. In some embodiments, projections 36B comprise a tapered section near its radially outermost end operatively arranged to allow engagement of projections 36B with female connector 38, specifically, apertures 38A, to occur with greater ease.

Female connector 38 comprises one or more apertures 38A extending radially inward from radially outward facing surface 26. Apertures 38A are operatively arranged to engage projections 36B to lock section 20B to section 20A. Female connector 38 further comprises recess 38B. In some embodiments, recess 38B is arranged in radially inward facing surface 28 (i.e., extends radially outward from radially inward facing surface 28). As section 20B is displaced toward section 20A, female connector 38 engages projections 36B and displaces radially outward in radial direction RD1. Once apertures 38A are aligned with projections 36B, female connector 38 snaps back radially inward, in radial direction RD2, thereby securing section 20B to section 20A.

Service valve body 100 generally comprises section or tube 102, section or tube 118, and connector body 140 to form a plurality of ports, for example, port 108, port 110, port 124, and port 141. Section 102, section 118, connector body 140 are connected such that all ports 108, 110, 124, and 141 are in fluid communication. Section 102 comprises end 104 forming port 108 and end 110 forming port 110. In some embodiments, and as shown, port 108 and port 110 are concentrically aligned. In some embodiments, port 108 is a service port and may comprise a valve stem or a stop collar (retainer) arranged therein. In some embodiments, section 102 comprises threading 112 on its radially outward facing surface proximate end 104. In some embodiments, cap 160 is threadably engaged with threading 112 to seal port 108. In some embodiments, port 110 is a middle port operatively arranged to be connected to a compressor or heat pump in a refrigeration system. In some embodiments, service valve body 100 comprises flange 114 connected to end 106. Flange 114 may comprise one or more through-holes 116 operatively arranged to secure service valve body 100 to another component (e.g., a compressor). In some embodiments, port 108 comprises a first diameter and port 110 comprises a second diameter, the second diameter being equal to the first diameter. In some embodiments, port 108 comprises a first diameter and port 110 comprises a second diameter, the second diameter being nonequal to the first diameter.

Section 118 comprises end 122 connected to section 102 and end 120 forming port 124. In some embodiments, port 124 may be a valve port and thus comprise a valve therein (e.g., a Schroeder valve). The valve in port 124 may control fluid flow within service valve body 100, for example, between ports 108, 110, and 141. In some embodiments, section 118 comprises threading 126 on its radially outward facing surface proximate end 120. In some embodiments, cap 162 is threadably engaged with threading 126 to seal port 124. In some embodiments, and as shown, port 124 is concentrically aligned with port 141. In some embodiments, section 118 is perpendicular to section 102. In some embodiments, section 118 is non-perpendicular to section 102. In some embodiments, port 124 comprises a first diameter and port 141 comprises a second diameter, the second diameter being greater than the first diameter. In some embodiments, port 124 comprises a first diameter and port 141 comprises a second diameter, the second diameter being less than or equal to the first diameter.

Connector body 140 comprises through-bore or port 141 extending from end 142 to end 144, radially inward facing surface 146, groove 150, radially outward facing surface 152, and groove 154. End 142 is connected to section 102. Connector body 140 is arranged to be connected to a component that is filled with a fluid or through which fluid flows. For example, connector body 140 may be connected to a refrigerant line (i.e., tube 80). It should be appreciated that fluid connection assembly 10 may be used in various other components, assemblies, and subassemblies in which fluid connection is desired. Seals 162A-B are arranged in connector body 140. Specifically, seal 162A-B are arranged in grooves 150A-B to engage tube 80 (i.e., radially outward facing surface 84). Grooves 150A-B are arranged spaced apart axially in radially inward facing surface 146. In some embodiments, seals 162A-B are O-rings. In some embodiments, radially inward facing surface 146 is a substantially cylindrical surface. End 144 is operatively arranged to engage shoulder 87, specifically, to prevent axial displacement of tube 80 is axial direction AD1. In some embodiments, and as shown, connector body 140 comprises radially inward facing surface 148, which comprises a diameter that is less than the diameter of radially inward facing surface 146. Radially inward facing surface 148 is connected radially inward facing surface 146 via surface 147. In some embodiments, surface 147 is a substantially axial facing surface and faces axial direction AD2. In some embodiments, surface 147 acts as a stop or seat for tube 80 thereby preventing tube 80 from being displaced in axial direction AD1 with respect to connector body 140.

Groove 154 is arranged in radially outward facing surface 152. Groove 154 is arranged axially between end 144 and end 142. Groove 154 comprises a radially outward facing surface and two axial facing surfaces. The radially outward facing surface of groove 154 comprises a diameter that is less than the diameter of radially outward facing surface 152. Groove 154 is operatively arranged to engage with flange 30 to connect retainer 20 to connector body 140.

Groove 154 comprises a width that is greater than the width of flange 30. In the partially assembled locked state, when retainer 20 is connected to connector body 140, without tube 80 properly connected or present at all, flange 30 and thus retainer 20 is displaceable in axial direction AD1 and axial direction AD2 with respect to groove 154 and thus connector body 140 (i.e., flange 30 can slide back and forth within groove 154). This provides an indication that fluid connection assembly 10 is not properly assembled. When retainer 20 is connected to connector body 140, with tube 80 properly connected, flange 30 and thus retainer 20 is not displaceable (or is not displaceable as much) in axial direction AD1 and axial direction AD2 with respect to groove 154 and thus connector body 140 (i.e., flange 30 abuts against the left surface of groove 154 as shown in FIG. 4). In some embodiments, connector body 140 is arranged perpendicular to section 102. In some embodiments, connector body 140 is arranged non-perpendicular to section 102. In some embodiments, connector body 140 comprises a metal, a polymer, and/or a ceramic.

To assemble fluid connection assembly 10, tube 80 is inserted in axial direction AD1, with end 82 first, into connector body 140. Radially outward facing surface 84 engages seals 62A-B and section 83 is arranged inside of connector body 140 proximate radially inward facing surface 146. Shoulder 87 engages end 144 of connector body 140, specifically, surface 86 abuts against end 144. In some embodiments, and as shown, shoulder 87 resides completely outside of connector body 140. Then, retainer 20 is secured over both connector body 140 and tube 80. Specifically, sections 20A and 20B are arranged over connector body 140 such that flange 30 is at least partially aligned with groove 154 and flange 32 is at least partially aligned with surface 88. Sections 20A and 20B are displaced radially inward toward each other (i.e., in radial direction RD2) until female connector 38 fully engages male connector 36 and retainer 20 is in the locked state. Additionally, flange 32 engages tube 80, specifically radially outward facing surface 90, thereby preventing the ingress of foreign materials into fluid connection assembly 10.

In the fully assembled locked state, flange 30 engages groove 154, radially inward facing surface 28 engages radially outward facing surface 152 and flange 32 engages shoulder 87 of tube 80. In some embodiments, in the fully assembled locked state, flange 30 abuts against the left surface of groove 154, flange 32 abuts against surface 88, and surface 86 abuts against end 144. In some embodiments, in the fully assembled locked state, flange 30 abuts against the radially outward facing surface of groove 154, thus preventing radial or circumferential displacement of retainer 20 with respect to connector body 140. In some embodiments, flange 32 engages radially outward facing surface 90. The engagement of tube 80 with connector body 140 prevents axial displacement of tube 80 in axial direction AD1 and the engagement of retainer 20 with connector body 140 and tube 80 prevents axial displacement of tube 80 in axial direction AD2, as well as radial directions RD1 and RD2, relative to connector body 140.

To disassemble, female connector 38 is displaced radially outward in radial direction RD1 with respect to male connector 36 until apertures 38A disengages projections 36B. Sections 20A and 20B are then separated to disengage flange 32 from shoulder 87, at which point tube 80 can be removed from connector body 140.

It will be appreciated that various aspects of the disclosure above and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

LIST OF REFERENCE NUMERALS

10 Fluid connection assembly
20 Retainer
20A Section
20B Section
21 Hole
22 End
24 End
26 Radially outward facing surface
28 Radially inward facing surface
30 Flange
32 Flange
34 Hinge
36 Male connector
36A Groove
36B Projection(s)
38 Female connector
38A Aperture(s)
38B Recess
62A Seal
62B Seal
80 Tube
82 End
83 Section
84 Radially outward facing surface
86 Surface
87 Shoulder or bead
88 Surface
89 Section
90 Radially outward facing surface
92 End
94 Through-bore
100 Service valve body
102 Section or tube
104 End
106 End
108 Port or service port
110 Port or middle port
112 Threading
114 Flange
116 Hole(s)
118 Section or tube
120 End
122 End
124 Port or valve port
126 Threading
140 Connector body
141 Port or line port
142 End
144 End
146 Radially inward facing surface
147 Axial surface or seat
148 Radially inward facing surface
150A Groove
150B Groove
152 Radially outward facing surface
154 Groove
160 Cap
162 Cap
AD1 Axial direction
AD2 Axial direction
RD1 Radial direction
RD2 Radial direction
D1 Diameter
D2 Diameter

What is claimed:

1. A fluid connection assembly, comprising:
a service valve body, including:
   a first section forming a first port and a second port;
   a second section connected to the first section and forming a third port;
a connector body forming a fourth port and comprising:
   a first end connected to the first section;
   a second end;
   a first radially outward facing surface comprising an annular groove; and
   a first radially inward facing surface; and
a retainer, including:
   a third end operatively arranged to be removably connectable to the connector body;
   a fourth end;
   a third section;
   a fourth section displaceable with respect to the third section;
   a second radially inward facing surface comprising:
      a first flange extending radially inward proximate the third end and operatively arranged to engage the annular groove; and
      a second flange extending radially inward proximate the fourth end; and
   a second radially outward facing surface.

2. The fluid connection assembly as recited in claim 1, wherein the first radially inward facing surface comprises at least one annual groove.

3. The fluid connection assembly as recited in claim 2, wherein the at least one annular groove comprises:
   a first annular groove; and
   a second annular groove spaced apart in an axial direction from the first annular groove.

4. The fluid connection assembly as recited in claim 2, wherein a seal is arranged in the at least one annular groove.

5. The fluid connection assembly as recited in claim 1, further comprising a flange fixedly secured to the first section proximate the second port.

6. The fluid connection assembly as recited in claim 5, wherein
the flange comprises a through-hole spaced apart from the second port.

7. The fluid connection assembly as recited in claim 1, wherein:
the first port and the second port are concentrically aligned; and/or
the third port and the fourth port are concentrically aligned.

8. The fluid connection assembly as recited in claim 1, wherein at least one of the second section and the connector body are arranged perpendicular to the first section.

9. The fluid connection assembly as recited in claim 1, wherein at least one of the first section and the second section comprises radially outward facing threading.

10. The fluid connection assembly as recited in claim 1, wherein:
the first flange comprises a first diameter;
the second flange comprises a second diameter; and
the first diameter is greater than the second diameter.

11. The fluid connection assembly as recited in claim 1, further comprising a tube including a shoulder, wherein the second flange is operatively arranged to engage the shoulder to secure the tube in the connector body.

12. The fluid connection assembly as recited in claim 11, wherein the shoulder resides completely outside of the connector body when the tube is secured to the connector body.

13. The fluid connection assembly as recited in claim 11, wherein the shoulder engages the second end when the tube is secured to the connector body.

14. The fluid connection assembly as recited in claim 11, wherein the shoulder abuts against the second end when the tube is secured to the connector body.

* * * * *